Jan. 7, 1969 R. E. SIX 3,421,051

STEEP WAVE FRONT SENSING CIRCUIT

Filed March 3, 1966

INVENTOR.
Rudolf E. Six
BY
Harness, Dickey & Pierce
ATTORNEYS

United States Patent Office 3,421,051
Patented Jan. 7, 1969

3,421,051

STEEP WAVE FRONT SENSING CIRCUIT

Rudolf E. Six, Harper Woods, Mich., assignor to The Udylite Corporation, Warren, Mich., a corporation of Delaware Filed Mar. 3, 1966, Ser. No. 531,417
U.S. Cl. 317—23 10 Claims
Int. Cl. H02h *5/00*

ABSTRACT OF THE DISCLOSURE

An electrical circuit for sensing a preselected range of steepness of a wave front, the circuit being connected to sense the wave front across an inductor and the circuit including a differential amplifier and a band pass filter arrangement.

Figures 1, 2:
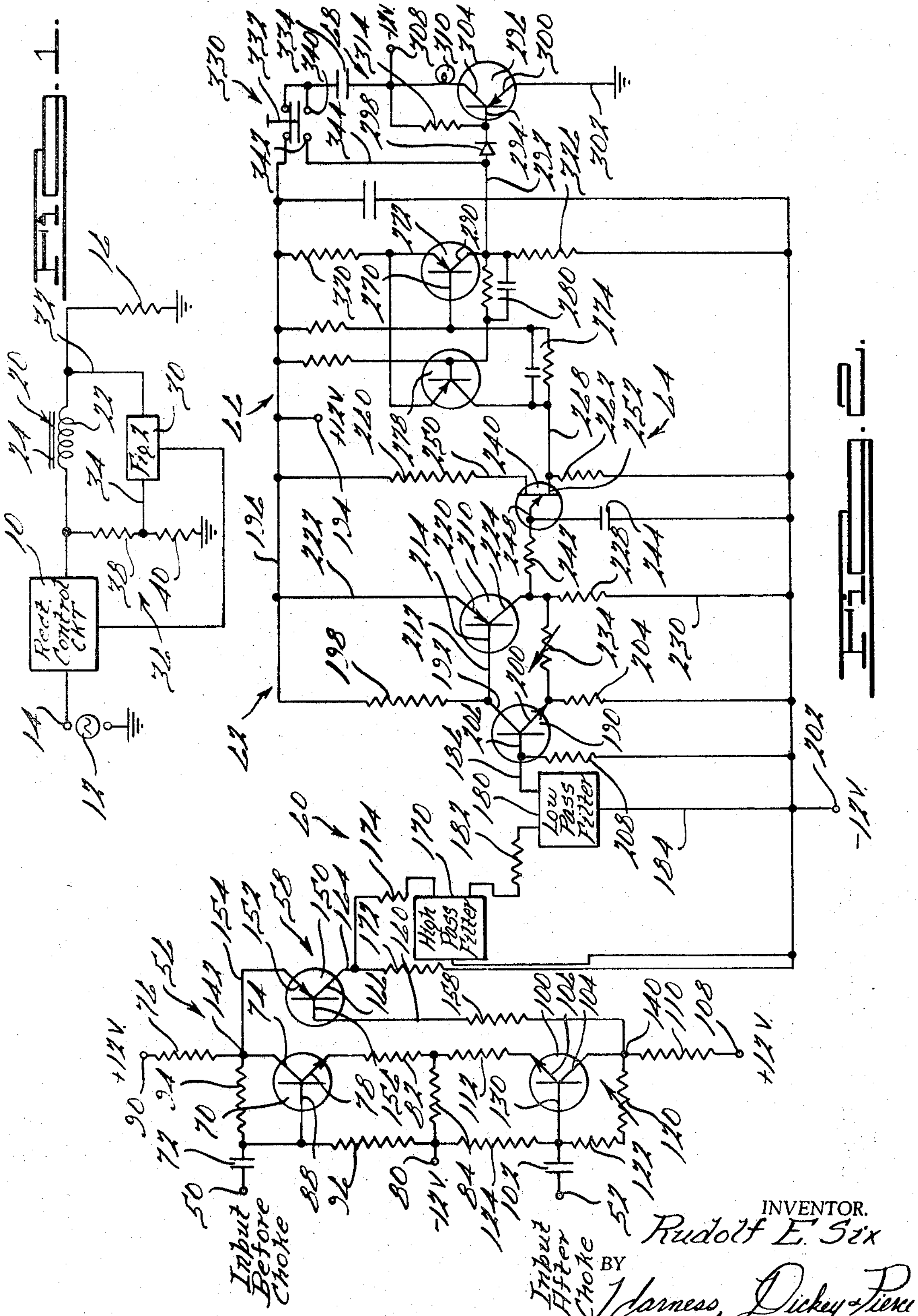

This invention relates generally to control systems which are responsive to wave forms of the type having steep current fronts and more specifically to a control system for use in conjunction with an electrolytic processing apparatus wherein the apparatus is controlled in response to predetermined conditions at the gap.

In certain electrolytic processes, particularly those utilizing a gap comprising a tool electrode and a workpiece, there arises certain conditions which are highly deleterious to the workpiece on which the operation is being performed and also on the apparatus being utilized. Referring specifically to electrochemical machining processes, a tool electrode is brought into proximity with the workpiece and an electrolyte is flowed between the workpiece and tool electrode. As electrical energy is applied between the workpiece and tool electrode, material removal from the workpiece is caused. While the material removal process is not totally understood, it has been found that certain conditions arise in the gap which cause the gap to spark or arc, thereby causing pitting of the tool electrode and deterioration thereof and, further, ruination of the finish being applied to the workpiece.

One theory as to the cause of the above conditions in the gap relates to the flow of impurities suspended in the electrolyte through the gap, whether the impurity be of an insulating character or a conductive character. In the case of an insulating impurity, a portion of the area of the tool electrode being presented to the workpiece is masked thereby lessening the conductive area for the current flow. Accordingly, the current has a tendency to fall rapidly to present a rapidly decreasing current wave front. Simultaneously, the masking of the workpiece due to the insulating character of the impurity causes a hill to form on the workpiece due to the lack of material removal from the area masked by the impurity.

In certain instances, the impurity is washed away leaving the hill which is of such a nature as to present a reduced gap to the tool electrode. Thus, subsequent conduction tends to center about the hill, further reducing the amount of current flow. On the other hand, in the situation where the impurity is of a conductive character, the gap is effectively short-circuited due to the impurity, thereby causing a sharp rise in current. Similarly, the rise in current presents a steep rising current front to the source of electrical energy.

A need has arisen to sense the presence of the impurity condition at the gap while at the same time maintaining standard processing conditions during the period when the impurities are not present. Further, it is desirable to provide a control circuit which is responsive only to the impurity condition at the gap and is not responsive to other conditions in the electrical circuit. Thus a circuit has been devised which is responsive to a steep current wave front, but is not responsive to other common conditions in the electrolytic processing circuit, as for example, ripple and the like.

In accordance with known practices in the electrolytic processing art, it is desirable to maintain the current flow through the gap at a maximum in order to achieve the greatest material removal rate from the workpiece. However, in certain instances, this high gap current will cause the aforementioned arcing or sparking. Accordingly, it is highly desirable to maintain the current removal of the system at a maximum consistent with a lack of sparking or arcing at the gap. The system provided herein enables an operator to automatically shut down the system in the event sparking or arcing occurs, and thereafter to lower the amount of electrical energy being fed to the gap to a new maximum wherein the sparking or arcing condition will be eliminated.

Accordingly, it is one object of the present invention to provide an improved control system for controlling the operation of electrolytic processing apparatus.

It is another object of the present invention to provide a control system which is responsive to certain selected conditions at the gap and controlling the operation of the electrolytic processing apparatus in response to those conditions.

It is still another object of the present invention to provide a control system for controlling the operation of an electrolytic processing apparatus in response to steep current wave fronts caused by conditions at the gap.

It is still another object of the present invention to provide an improved control system for an electrochemical processing apparatus wherein the control system operates with increased sensitivity and reliability.

It is still a further object of the present invention to provide an improved control system for an electrochemical processing apparatus which will shut down the processing apparatus in the event of the occurrence of certain conditions at the gap and indicate the shut down condition to an operator.

Further objects, features and advantages of this invention will become apparent from a consideration of the following description, the appended claims and the accompanying drawing in which:

FIGURE 1 is a schematic block diagram illustrating one preferred form of the present invention wherein the control circuit is interconnected in sensing relation with the load circuit to provide a control signal to control the operation of the input rectifier; and FIGURE 2 is a schematic diagram of one preferred form of a condition sensing circuit which may be utilized in the system illustrated in FIGURE 1.

Referring now to FIGURE 1 there is illustrated a schematic block diagram of a preferred system wherein a rectifier control circuit 10 is interconnected to control the flow of electrical energy from a source 12, at input terminal 14, to a load device 16. The rectifier control circuit 10 includes the common control functions or features normally incorporated into a system of this type, as for example, automatic voltage control, automatic current control, current density control, etc. The output circuit of the rectifier control circuit 10 is fed through an impedance device 20 which, in the particular embodiment illustrated, comprises an inductor coil 22 and a magnetic core 24. Thus any current flowing from the rectifier control circuit 10 to the load 16 passes through the inductor coil 22.

The inductor coil 22 has been chosen to have characteristics such that the normal ripple current being fed to the load 16 will pass through the inductor coil 22 without presenting a large voltage drop thereacross. However, if the aforementioned deleterious conditions occur at the gap, as for example, a sudden current rise or current drop, the steep current wave front reflected toward the coil 22 will provide a large voltage drop across the impedance coil 22 as compared to the voltage drop presented thereacross due to the ripple present on the load current.

The voltage across the inductor 22 is sensed by means of a control circuit 30 connected to the load side of the inductor 22 by means of a conductor 32, and to the source side of the inductor 22 by means of a conductor 34 and a voltage divider circuit 36 comprising a pair of resistors 38, 40. The upper side of resistor 38 is connected to the source side of the inductor 22 and the lower side of the resistor 40 is connected to ground. The juncture between the resistors 38 and 40 is connected to the control circuit 30 by means of the conductor 34 to provide a voltage divider circuit to the control circuit 30. The control circuit 30, as will be hereinafter seen, is so devised as to sense a rapid rise or fall of current to the load 16 and produce an output control signal on control output conductor 44 in the event the rapid rise of fall of current is sensed. In lower current rectifiers, the resistor 38 may be replaced with a capacitor and resistor 40 may be made variable to adjust for changing load currents.

However, as was explained above, the normal ripple current flowing through the inductor 22 will not trigger the control circuit 30 and an output pulse will not be produced on control output conductor 44. The control output pulse on conductor 44 is fed to the rectifier control circuit 10 by means of the conductor 44 whereby the source of electrical energy 12 is disconnected from the load 16 in the event a preselected fault condition or other condition exists at the gap.

This disconnection of the load is accomplished by means of various types of control circuits, one preferred embodiment of which is illustrated in FIGURE 2. The voltage level on the source side of the inductor 22 is fed to an input terminal 50, and the voltage level of the inductor at the load side thereof is fed to a second input terminal 52. The signal levels on input terminals 50 and 52 are fed to a differential amplifier 56 which provides an output signal in response to the difference in voltage levels between input terminal 50 and input terminal 52. The output signal of differential amplifier 56 is fed to an amplifier 58 which provides a pulsating output signal having a predetermined frequency which is determined by the rise and fall of the current wave front at the inductor 22. The output signal of amplifier 58 is fed through a filtering circuit 60 which selects a signal having a preselected range of frequencies, as for example, a range of frequencies between 4 kilocycles and 15 kilocycles.

The output of the filter circuit 60 is fed through an amplifier 62 to a pulsing circuit 64 which provides an output pulse at such time as a predetermined amount of current has been fed thereto. This amount of current may be derived from a series of pulses of low amplitude and long duration or high amplitude and short duration. The output from the pulsing circuit 64 is fed to a bistable storage circuit 66 which switches from one state to the other in response to a pulse being fed thereto from the pulsing circuit 64, and the state of the bistable circuit 66 is sensed by an output and reset circuit 68. The output and reset circuit 68 further includes means for resetting the bistable storage circuit 66 at such time as the condition at the gap has been cleared or compensated for and the operator is again ready to resume the electrolytic processing.

Referring now to the specific details of the various circuit subsystems and first to the differential amplifier, it is seen that the input signal impressed on input terminal 50 is fed to a transistor 70 through a coupling capacitor 72. The transistor 70 includes a collector circuit 74 connected to a source of positive potential through a collector resistor 76, and an emitter electrode 78 is connected to a negative source of potential at terminal 80 through resistors 82 and 84. The transistor 70 further includes a base electrode 88 which is provided a biasing voltage between the positive source of potential at input terminal 90 and the negative source at input terminal 80 by means of resistors 94 and 96. The transistor 70 is in the normally conductive state wherein current is flowing from input terminal 90, through the collector-emitter circuit of transistor 70, through resistors 82 and 84, to terminal 80. Base-emitter current is provided from terminal 90 through resistors 76 and 94 and the current flows through the base-emitter junction to resistors 82 and 84. The parameters of the circuit have been so chosen that the transistor 70 is normally conductive at a low conductive state during the period when no signal is present on input terminal 50.

The other side of the coil 22 is connected to input terminal 52 and the voltage level on terminal 52 is fed to a second transistor 100 through a coupling capacitor 102. As in the above situation, the collector-emitter circuit of transistor 100 includes a collector electrode 104 and an emitter electrode 106 wherein the collector electrode is connected to a source of DC potential at terminal 108 through a resistor 110, and the emitter electrode 106 is connected to the negative source of DC potential at terminal 80 through a resistor 112 and the resistor 84. It is to be noted that the potential at input terminal 108 corresponds in value to the potential at input terminal 90. The base-emitter bias voltage level is provided by means of an adjustable resistor 120 provided to balance the amplifier 56, connected to the resistor 110 and a second resistor 122 connected to the base electrode. The circuit to the negative source of potential at terminal 80 is completed through a circuit including resistors 110, 120, 122 and 124 for control of transistor 100, absent a signal at input terminal 52.

As is the normal situation, the resistors 76 and 110 are chosen to be of identical value, and the transistors 70 and 100 will conduct approximately the same amount of current thereby providing identical voltages at the collector electrodes 74 and 104. Similarly, if equal signals are fed to input terminals 50 and 52, the transistors 70 and 100 will conduct at a higher level, but will again conduct identically, thereby maintaining the collector electrodes 74 and 104 at the same voltage level. For purposes of this discussion it will be assumed that the voltage at the input terminal 50 will remain relatively constant and will consist primarily of the voltage present between the rectifier control circuit 10 and the inductor coil 22. Accordingly, the transistor 70 will provide a reference voltage for the amplifier circuit 56. However, the input voltage level at input terminal 52 will vary in accordance with any steep current wave front present on the load side of inductor 22. Thus, with a rise in voltage at input terminal 52, the transistor 100 will increase its conduction thereby lowering the potential at an output node 140 connected to the collector electrode 104. This is due to the fact that the increased conduction of transistor 100 will draw node 140 further away from the potential at terminal 108 thereby rendering the voltage at node 140 less and less positive, or more and more negative depending on the value of resistors 84 and 112.

The collector electrode 74 is also connected to an output node 142, the voltage at which rises and falls in accordance with the conduction of transistor 70. As was stated above, it will be assumed that the conduction of transistor 70 remains relatively constant but it is to be understood that it may vary in accordance with the amount of ripple introduced into the load circuit etc. The DC level of the circuit is effectively blocked from both input circuits due to capacitor 72 and 102. Accordingly, the DC level on the load circuit will have relatively little effect on the differential amplifier 56. The voltage between nodes 140 and 142 is fed to the amplifier 58 and specifically to a PNP type transistor 150 wherein the voltage at node 142 is fed to an emitter electrode 152 by means of conductor 154, and the voltage at node 140 is connected to a base electrode 156 by means of a current limit resistor 158 and a conductor 160.

As is readily apparent, the conduction of transistor 150 is directly controlled by the conduction of transistors 70 and 100, and specifically by the rise and fall of the voltage at node 140 relative to the voltage at node 142. As transistor 100 conducts a greater amount due to a rise in signal at the input terminal 52, the voltage at node 140 will drop thereby causing transistor 150 to conduct a greater amount.

The output signal on conductor 164, connected to a collector electrode 166, is fed to the filter circuit 60, in this case to a high-pass filter 170 which is adapted to pass substantially all signals having a frequency level greater than approximately 4 kilocycles. The high-pass filter circuit may be of any known configuration and the signal at collector electrode 166 is fed to the filter by means of resistors 172 and 174. The output signal, a signal having a frequency greater than 4 kilocycles, is fed subsequently to a low-pass filter 180 by means of a resistor 182 and a conductor 184 wherein the low-pass filter is adapted to pass all signals having a frequency less than approximately 15 kilocycles. Again the low-pass filter may take any configuration known in the art. Accordingly, an output signal from the filter circuit 60 having a frequency characteristic falling between approximately 4 kilocycles and 15 kilocycles is fed to the amplifier circuit 62 by means of a conductor 186.

The amplifier circuit 62 generally comprises a first transistor amplifier 190 having a collector electrode 192 connected to a source of positive DC potential at terminal 194 by means of a conductor 196 and a resistor 198. An emitter electrode 200 is connected to a negative source of potential at terminal 202 by means of an emitter resistor 204, and the input signal on conductor 86 is fed to a base electrode 206 by means of resistor 208. Accordingly, the output of transistor 190 will be governed in accordance with the input pulses presented on input conductor 186, and the conductive state of transistor 190 is fed to a second amplifier 210 by means of a conductor 212 connected to a base electrode 214. Transistor 210 is of the PNP type wherein an emitter electrode 220 is connected to the source of DC potential at terminal 194 through the conductor 196 and a second conductor 222 and a collector electrode 224 is connected to the negative source of potential at terminal 202 by means of a resistor 228 and a conductor 230.

A negative feedback circuit in the form of a variable resistor 234 is interconnected between the collector electrode 224 and the emitter electrode 200 to provide a variable control of the amplifier circuit 62. As is well known in the art, the resistor 234 provides a positive signal at emitter electrode 200 which achieves the same result as though a more negative signal had been placed at the base electrode 206. The more positive the signal impressed on emitter electrode 200, the less the conduction of transistor 190 and the less the gain of the amplifier circuit 62.

The output pulses of transistor 210 are fed to a normally nonconductive unijunction transistor 240 by means of an integrating circuit in the form of a resistor 242 and a capacitor 244. With the unijunction transistor in the nonconductive state, the output pulses from transistor 210 serve to charge the capacitor 244 through the resistor 242, thereby raising the potential of an emitter electrode 248 until such time as the breakover voltage of the unijunction transistor is achieved and current flow occurs between base one 250 and base two 252.

From the foregoing circuitry it is seen that the integrating circuit including resistor 242 and capacitor 244 substantially measures the severity of the condition at the gap due to the fact that the energy of the pulses passing through the differential amplifier 56 are integrated at the integrator circuit. Thus if an extreme short circuit occurs, including a high current rise for a short period of time, the unijunction 240 will be fired. Similarly, a series of low amplitude pulses occurring in rapid succession will charge the capacitor 244 and cause the unijunction 240 to fire.

The main current carrying base one to base two circuit of the unijunction transistor 240 comprises a resistor 260 connected to positive conductor 196 and a resistor 262 connected to negative terminal 202. The output pulse from unijunction transistor 240 is fed to the bistable circuit 66, in the form of a flip flop circuit, by means of a conductor 268. The pulse is fed to a base electrode 270 of a normally conductive transistor 272 by means of a coupling network 274. A normally nonconductive transistor 278 is cross coupled with the transistor 272 by means of a coupling circuit 280 wherein the switching of the normally conducting transistor 272 to the nonconductive state will transfer or switch the normally nonconductive transistor 278 to the conductive state. The flip flop circuit 66 is of the conventional type and need not be fully explained herein.

The output signal from a collector electrode 290 is fed to the indicator or relay output circuit 68 by means of a conductor 292 and more specifically is fed to the base electrode 294 of a PNP type transistor 296 through a diode 298. The emitter collector circuit for the transistor 296 includes an emitter electrode 300 connected to ground potential or approximately zero volts through a conductor 302 and a collector electrode 304 connected to a source of negative potential at terminal 308 through an indicating device, as for example, a lamp 310. The base bias for the transistor 296 is provided by a resistor 314 connected at one end to the base electrode 294 and at the other end to the negative terminal 308.

With the transistor 272 of the flip flop circuit 66 in its normal or conductive state, a forward conductive circuit is provided from the positive potential at input terminal 194 through conductor 196, a resistor 320, the emitter collector circuit of transistor 272, the conductor 292, the diode 298, resistor 314 to negative terminal 308. The resistor 320 has been chosen to be of such value as compared to a resistor 326 that the base electrode 294 is rendered normally positive with respect to the emitter electrode 300, thereby rendering the transistor 296 normally nonconductive. However, when an input pulse is fed to bistable circuit 66 by means of conductor 268, thereby rendering transistor 272 to the nonconductive state, the potential at conductor 292 will be lowered with respect to the emitter electrode 300 thereby rendering the transistor 296 to the conductive state.

The conduction of transistor 296 will cause indicator light 310 to illuminate thereby indicating a fault condition at the gap. It is to be noted that the device 310 may comprise a relay coil which disconnects the main power from the gap in the event a fault occurs, or both systems may be utilized wherein the main power supply is connected from the gap and an indicating device is energized.

A reset circuit 330 including a switch 332 and a capacitor 334 has been provided in the output circuit 68 to enable an operator to reset the bistable circuit 66. During the period when the output circuit 68 is in its normal state and transistor 296 is nonconductive, the capacitor 334 is charged positive at the upper plate thereof and negative at the lower plate. The charging circuit includes conductor 196, the switch 332, the capacitor 334 to the negative potential at terminal 308. When the reset button 332 is depressed, a circuit is completed from capacitor 334 through a pair of terminals 340, 342, a conductor 344 through the diode 298, resistor 314 back to the capacitor 334. Thus the potential of conductor 292 is raised to a sufficiently positive level to pulse the conducting transistor 278 to its normally nonconductive state thereby switching the bistable circuit 66 to its reset state. In this way the operator may lower the input voltage to the gap by means of any suitable adjustment provided on a rectifier circuit 10 and reset the gap sensing circuit by means of switch 330.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a power supply circuit for supplying electrical energy to a load including a reactive impedance, a system for sensing a steep wave front across the reactive impedance comprising signal producing circuit means for providing a control signal having an electrical characteristic which varies in response to a predetermined range of variations in the steepness of the wave front characteristics including differential circuit means connected across the reactive impedance, and output circuit means connected in responsive relation with said signal producing circuit means for producing an output signal in response to said control signal.

2. The circuit of claim 1 wherein said differential circuit means includes a differential amplifier and said electrical characteristics includes a wave front exceeding a predetermined *di/dt*, said differential amplifier being connected across said impedance means.

3. The circuit of claim 1 wherein said impedance means includes an inductor and said differential circuit means includes a differential amplifier connected across said inductor.

4. The circuit of claim 3 wherein said differential amplifier includes unidirectional signal producing means for producing a unidirectional signal in response to said wave front variations, said differential amplifier producing a signal output in said unidirectional signal producing means when said wave front characteristic exceeds a preselected *di/dt* ratio.

5. The circuit of claim 4 further including integrating means connected to receive said signal output and integrating said signal.

6. The circuit of claim 5 further including voltage responsive means connected to said integrating means having a first and second state, said voltage responsive means switching to said second state in response to the voltage level of said integrating means reaching a preselected value.

7. The circuit of claim 6 further including bistable circuit means connected to said voltage responsive means and having a first and second state, said bistable storage means switching to said second state in response to the condition of said voltage responsive means switching to said second state.

8. The circuit of claim 7 further including reset circuit means connected to said bistable circuit means for resetting said bistable circuit means to said first state including storage means for storing electrical energy during the period that said bistable storage means is in said first state, and switch means for feeding said stored electrical energy to said bistable storage means when said bistable storage means is in said second state.

9. The circuit of claim 8 further including filter means connected between said unidirectional signal producing means and said integrating means for isolating signals from said integrating means not falling within a preselected range of frequencies.

10. The circuit of claim 9 wherein means is provided for shutting down the power supply system in response to the switching of said bistable circuit from said first to said second state and means for indicating the state of said bistable circuit, said reset circuit being adapted to reenergize the power supply when said bistable circuit is switched from said second to said first state.

References Cited

UNITED STATES PATENTS

| | | | |
|---|---|---|---|
| 3,173,078 | 3/1965 | Farnsworth | 317—33 |
| 3,174,094 | 3/1965 | Farnsworth et al. | 317—33 |
| 3,334,272 | 8/1967 | Lipnitz | 317—33 |

JOHN F. COUCH, *Primary Examiner.*

R. V. LUPO, *Assistant Examiner.*

U.S. Cl. X.R.

317—22, 31, 33